United States Patent [19]

Lang

[11] 4,264,135
[45] Apr. 28, 1981

[54] METHOD AND APPARATUS FOR CONVERTING STEADY LIGHT INTO OUTPUT LIGHT COMPRISED OF PERIODIC HIGH AMPLITUDE PULSES

[75] Inventor: Paul W. Lang, Orange, Calif.

[73] Assignee: Raymus K. Payton, Newport Beach, Calif.

[21] Appl. No.: 97,516

[22] Filed: Nov. 26, 1979

[51] Int. Cl.³ .............................................. G02B 27/14
[52] U.S. Cl. ..................................... 350/174; 350/286
[58] Field of Search ................. 350/169, 171, 174, 286

[56] References Cited

U.S. PATENT DOCUMENTS

| 3,459,466 | 8/1969 | Giordmaine | 350/356 |
| 3,684,346 | 8/1972 | Lang | 350/96.24 |

*Primary Examiner*—Richard A. Rosenberger
*Attorney, Agent, or Firm*—Fulwider, Patton, Rieber, Lee & Utecht

[57] ABSTRACT

A steady light beam such as continuous wave, constant amplitude coherent light as provided by a laser, is moved through a given acute angle at a given frequency. The light beam is passed into a solid body of light transmissive material while moving through the given acute angle such that the initially received light in the body when the beam starts its movement through the acute angle follows a first path of a first given length before it emerges from the body. Subsequently received light in the body when the beam has completed its movement through the acute angle, in turn, follows a second path of a second given length different from the first given length before it emerges from the body. The referred-to-frequency is adjusted to define a time increment for the beam to move through the referred to given acute angle. This time increment is made substantially equal to the time it takes light to travel a path length in the body equal to the difference in the referred to first and second given lengths. With such an arrangement, the light beams entering the body at the extremes of the acute angle will exit or emerge from the body coincidentally in time thereby resulting in a high amplitude pulse. These high amplitude pulses are generated at the frequency of movement of the beam through the referred to acute angle.

10 Claims, 3 Drawing Figures

METHOD AND APPARATUS FOR CONVERTING STEADY LIGHT INTO OUTPUT LIGHT COMPRISED OF PERIODIC HIGH AMPLITUDE PULSES

This invention relates generally to optics and more particularly to a method and apparatus for converting steady light into output light comprised of periodic high amplitude pulses.

BACKGROUND OF THE INVENTION

U.S. Pat. No. 3,459,466 issued to J. A. Giordmaine on Aug. 5, 1969 and assigned to The Bell Telephone Laboratories, describes an optical beam peak power amplifier and buncher. Essentially, this patent teaches the concept of breaking up a light beam into spatially separated portions and thence subjecting the spatially separated portions to different delay times so that the same can be reassembled to all occur at a single moment in time. In my U.S. Pat. No. 3,684,346 issued Aug. 15, 1972 there is described an optical integrating system which accomplishes an integration of spatially and time separated light pulses into a single large pulse of light by utilizing delay techniques, and in this respect, the basic principle of "bunching" is the same as disclosed in the first-mentioned Giordmaine patent. However, in my later U.S. Pat. No. 3,684,346, a unique delay arrangement utilizing fiber optics is disclosed in combination with a special reflective crystal capable of generating progressively increasing annular rings of light. This arrangement and special reflective crystal was not known prior to the publication of my referred to patent and constitutes a specific improvement on the basic concepts involved.

Notwithstanding the particular system already known and as set forth in my above referred-to U.S. Pat. No. 3,684,346, there still exists a need to provide a more practical type of time delay means for realizing the desired end of generating high amplitude pulses of light so that fully practical systems can be developed and utilized.

BRIEF DESCRIPTION OF THE PRESENT INVENTION

With the foregoing in mind, I have now discovered a further improved method and apparatus for converting steady light into output light comprised of periodic high amplitude pulses. Basically, this new method and apparatus constitutes an improvement over the above-mentioned prior United States patents.

Briefly, in accord with the method of this invention, a steady light beam is moved through a given acute angle at a given frequency. The light beam is passed into a solid body of light transmissive material while moving through the given acute angle such that the initially received light in the body when the beam starts its movement through the acute angle follows a first path of a first given length before it emerges from the body. Subsequently received light in the body when the beam has completed its movement through the acute angle, follows a second path of a second given length different from the first given length before it emerges from the body. The value of the given frequency of movement of the light beam through the given acute angle is adjusted such that the time increment for the beam to move through the given acute angle is substantially equal to the time it takes light to travel a path length in the body equal to the difference in the first and second given lengths. With this arrangement, the initial entering light beam emerges from the body at the same time that the subsequently received light beam emerges from the body thus resulting in a high amplitude pulse.

In the preferred embodiment, the body itself is elongated with a longitudinal axis and has side surfaces from which internal light reflections can take place, the light beam entrance area being on a side surface at one end of the body and a light exit area being on a side surface at the opposite end of the body. The number of the side surfaces is such that the light beam is internally reflected therefrom and will travel in the manner of a helical path about the said longitudinal axis. The pitch of this helical path increases as the angle of the beam axis with its initial axis approaches said given acute angle.

The desired beam delay and resultant conversion of steady light into high amplitude periodic pulses is thus accomplished by simply introducing a rapidly moving steady light beam into a single integral body of light transmissive material, careful control of the manner of moving the beam and of the geometry of the body providing the desired results.

BRIEF DESCRIPTION OF THE DRAWINGS

A better understanding of this invention will be had by now referring to the accompanying drawings in which.

DETAILED DESCRIPTION OF THE PREFERRED EMBODIMENT

Figure 1:
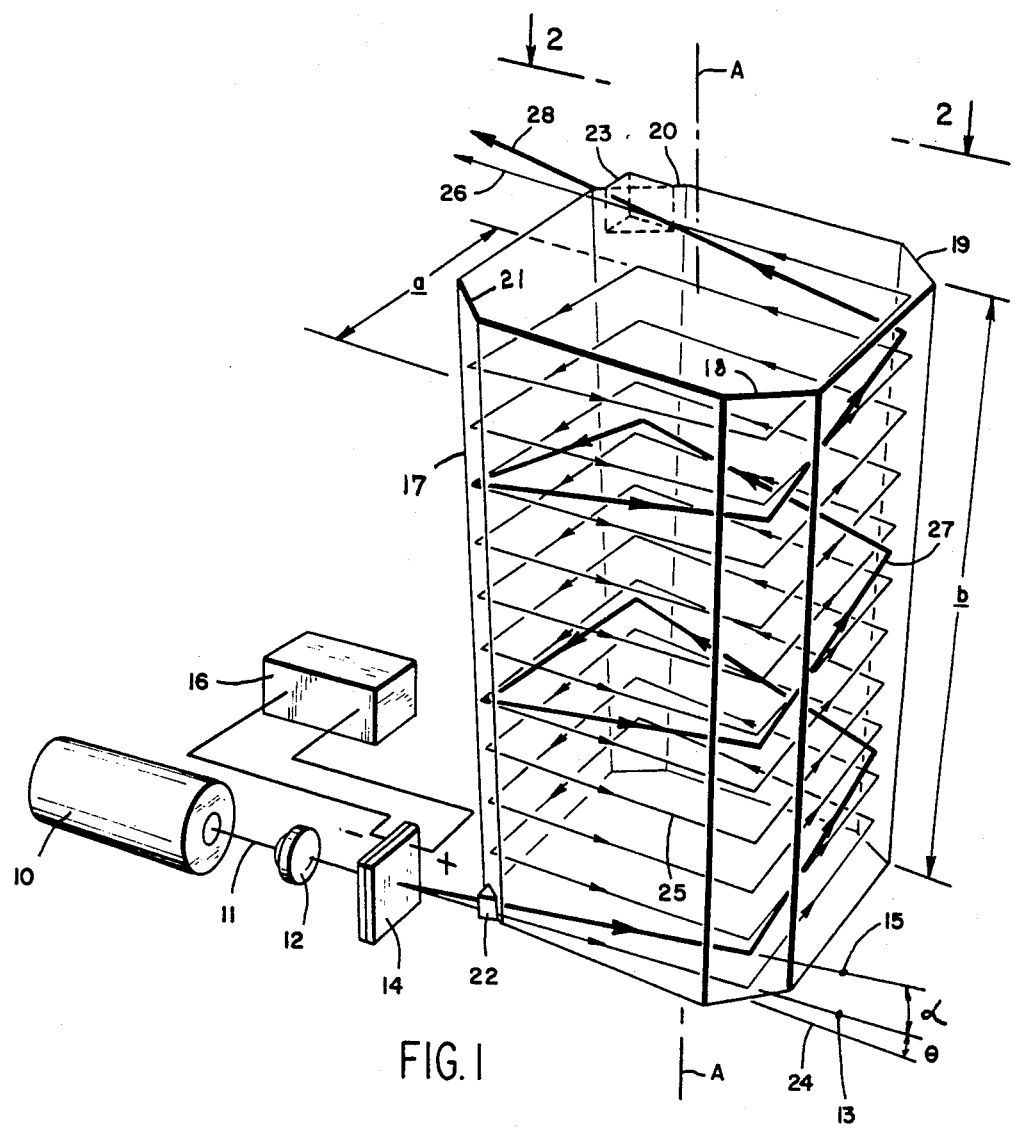
FIG. 1 is a highly diagrammatic perspective view of the basic components of a preferred apparatus for carrying out the method of this invention.

Referring first to the lower left portion of FIG. 1, there is shown a continuous wave laser 10 generating a steady light beam 11. A collimating lens system 12 may be provided in front of the laser to collimate the beam 11 along an initial axis 13. While normally a laser beam exhibits very little divergence, the use of the collimating lens 12 will minimize any spread in the beam axis as the laser light travels along an extended path.

In accord with a first feature of the present invention there is provided a means for moving the laser beam through a given acute angle. In the particular embodiment of FIG. 1, this means takes the form of an electro-optical crystal 14 through which the beam 11 passes. Crystal 14 when subjected to an electrical voltage will move the beam 11 from its initial axis 13 to a new axis 15. An appropriate electrical signal can effect such movement periodically and is provided in FIG. 1 by an appropriate oscillator 16. The frequency of the electrical signal from the oscillator 16 constitutes a given frequency defining a given time increment for the laser beam 11 to move from its initial axis 13 to its new axis 15. The significance of this time increment will become clearer as the description proceeds. In FIG. 1, the given acute angle through which the beam is moved is indicated by the Greek letter alpha.

Cooperating with the moving light beam as illustrated in the main portion of FIG. 1, is an elongated solid body 17 of light transmissive material such as glass. Body 17 has a longitudinal axis A—A running in a vertical direction as oriented in FIG. 1. A cross section normal to the axis A—A takes the shape of a polygon having at least four sides. In the specific embodiment illustrated, the cross section has eight sides but only four of these sides define side surfaces which are actually utilized so that, in effect, the body illustrated could have a simple square cross section.

The significant four sides in FIG. 1 are designated 18, 19, 20 and 21. These side surfaces are high polished and lie in planes at 90° to each other as illustrated.

Body 17 defines light entrance and light exit areas adjacent to its opposite ends respectively. In the example shown in FIG. 1, these light entrance and light exit areas are defined by a light entrance 45° prism 22 and a light exit 45° prism 23 affixed to portions of the sides 21 and 20 respectively adjacent to the opposite ends of the body 17.

It will be noted that the light entrance prism 22 is substantially smaller than the light exit prism 23 and the reason for this difference in size will become clearer as the description proceeds. The prism 22 and 23 may be integrally formed with the glass body 17 or alternatively cemented to the side surfaces. It is preferable, however, that the prisms simply be an integral portion of the glass body so as to minimize any light losses across the interface of the prism and body.

The face of the prism 22 is positioned to intercept the collimated output beam from the crystal 14 over its degree of movement as defined by the given acute angle alpha, heretofore described. The initial axis 13 of the beam is directed to form an acute angle theta with a plane normal to the longitudinal axis A—A of the body 17, this plane being schematically indicated by the line 24. The angle theta is just made sufficient to result in the light beam along the initial axis 13, after being internally reflected from the surfaces of the sides 18, 19, and 20 being at a level to clear the light entrance prism 22 so that the beam will continue to be internally reflected from the surfaces of the sides to progress about the axis A—A in the manner of a helix until it reaches the light exit prism 23 from whence it emerges from the body. The helical path followed by this initially received light beam is indicated by the numeral 25 and its output from the exit prism 23 is shown at 26.

As the angle between the beam and its initial axis 13 approaches the given acute angle alpha, the pitch of the helical path will increase.

Thus, still referring to FIG. 1, when a subsequent light beam entering the body corresponding to the beam when it has completed its movement through the given acute angle alpha; that is, when the beam is travelling along its new axis 15, there will be substantially fewer helical turns because of the change in the angle prior to exiting of the light beam from the exit prism 23. These fewer turns are indicated by the heavier path line 27 in FIG. 1. The exiting light corresponding to the beam entering the body along its new axis 15 is designated 28 in FIG. 1.

If the length of the helical path 25 between the entrance prism 22 and exit prism 23 defines a first given length and the length of the helical path 27 between the entrance prism 22 and exit prism 23 defines a second given length, it is possible to adjust the frequency of the beam movement through the acute angle such that the time increment for the beam to travel from its initial axis 13 to its new axis 15 is precisely equal to the time for light to travel a path in the body equal to the difference in the first and second path lengths.

Because of limitations in frequency adjustments, it should be understood that a high reflective index material for the body 17 can be selected and the dimensioning of the body appropriately adjusted to provide helical path lengths different by an amount such that the time for light to travel said amount in the body 17 is equal to the time for the beam to pass through the given acute angle.

Provided the foregoing conditions are met, then there will be a coincidence of the light exiting from the exit prism 23 resulting from light entering the entrance prism along the initial axis 13 and light entering the entrance prism along the new axis 15. The exiting light occurring in time coincidence will thus represent a high amplitude light pulse. In other words, this high amplitude light pulse encompasses all of the light emitted between the time that the light beam initially is directed along the axis 13 and the time the light beam reaches the new axis 15. Further, it will be clear that these high amplitude light pulses will occur at precisely the frequency of the signal applied to the electro-optical crystal 14 from the oscillator 16.

Figure 2:
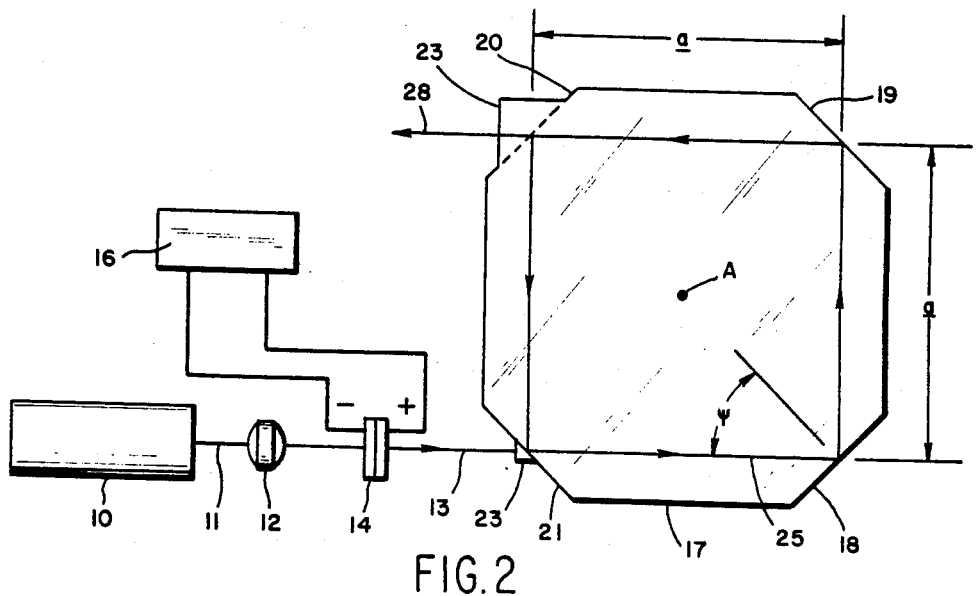
FIG. 2 is a top plan view of the basic components looking in the direction of the arrows 2—2 of FIG. 1.

Referring now to FIG. 2, for the particular embodiment disclosed wherein four internally reflecting surfaces are provided oriented at 90° to each other surrounding the longitudinal axis A—A, the resulting helical path will appear as a square when viewed along the axis A—A. The angle of incidence $\psi$ of the incoming beam such as indicated by the path 25 internally reflected from the surface 18 will be 45°. This angle is well above the critical angle for total internal reflection when a glass body having a refractive index of the order of 1.6 is utilized. For such refractive index, the critical angle is approximately 38°. Accordingly, it will be clear that all of the light is held wholly within the body while effecting the various circuits making up the helical path until such time as the light reaches the exit prism 23.

It is to be appreciated that by introducing the light beam adjacent to the lower end portion of the body in the manner described so as to cause it to follow a helical path about the longitudinal axis, the path length of travel of the light in the body can be made substantially greater than any one of the basic dimensions of the body; that is, the length, width or height of the body. Thus, if a represents the side of the square helical path 25 as indicated clearly in FIG. 2, and if b represents a number of circuits or helical turns of the path between opposite ends of the body 17, the total path length will be approximately 4ab-a, the "—a" term taking into account the missing path length between surfaces 20 and 21 of the last or topmost circuit.

As mentioned heretofore, the light beam 11 is collimated by the collimating lens 12 to minimize divergence of the beam. Notwithstanding the use of such collimation, there will still be some beam divergence. Nevertheless, there will still be some slight unavoidable spread of the laser light beam particularly when travelling over a fairly long path. It is for this reason that the exiting prism 23 is made larger than the entrance prism 22. The larger exiting prism 23 will accommodate the spread in the light to assure that all light resulting from sweeping of the beam through the angle alpha exits from the body. Since the time increment for the laser beam to move between its initial axis 13 through the angle alpha to its new axis 15 is made equal to the time it takes light to travel in the body 17 a distance corresponding to the difference of the lengths of the paths 25 and 27, it will be evident that as the beam moves from its initial axis 13 towards its new axis 15, the injected light beam into the body will more or less continuously be meeting the immediately preceding injected beam so that the high amplitude pulse builds up until it finally exits at the prism 23 in one "bunched" energy pattern. After such high amplitude pulse has exited from the body, the beam is returned to its initial axis and again swept through the angle alpha. However, in order to utilize the maximum amount of available steady light in forming the high amplitude pulses, it is desirable to excite the crystal 14 with an assymmetrical wave form so that essentially the return of the beam from its new axis 15 to its initial axis 13 takes place at a far greater rate than the rate of movement of the beam from its initial axis 13 to its new axis 15. By providing such an assymmetrical wave form to the crystal 14, more than 50% of the steady light emitted during any given period defined by the given frequency of the oscillator 16 will be utilized in making each high amplitude pulse.

Figure 3:
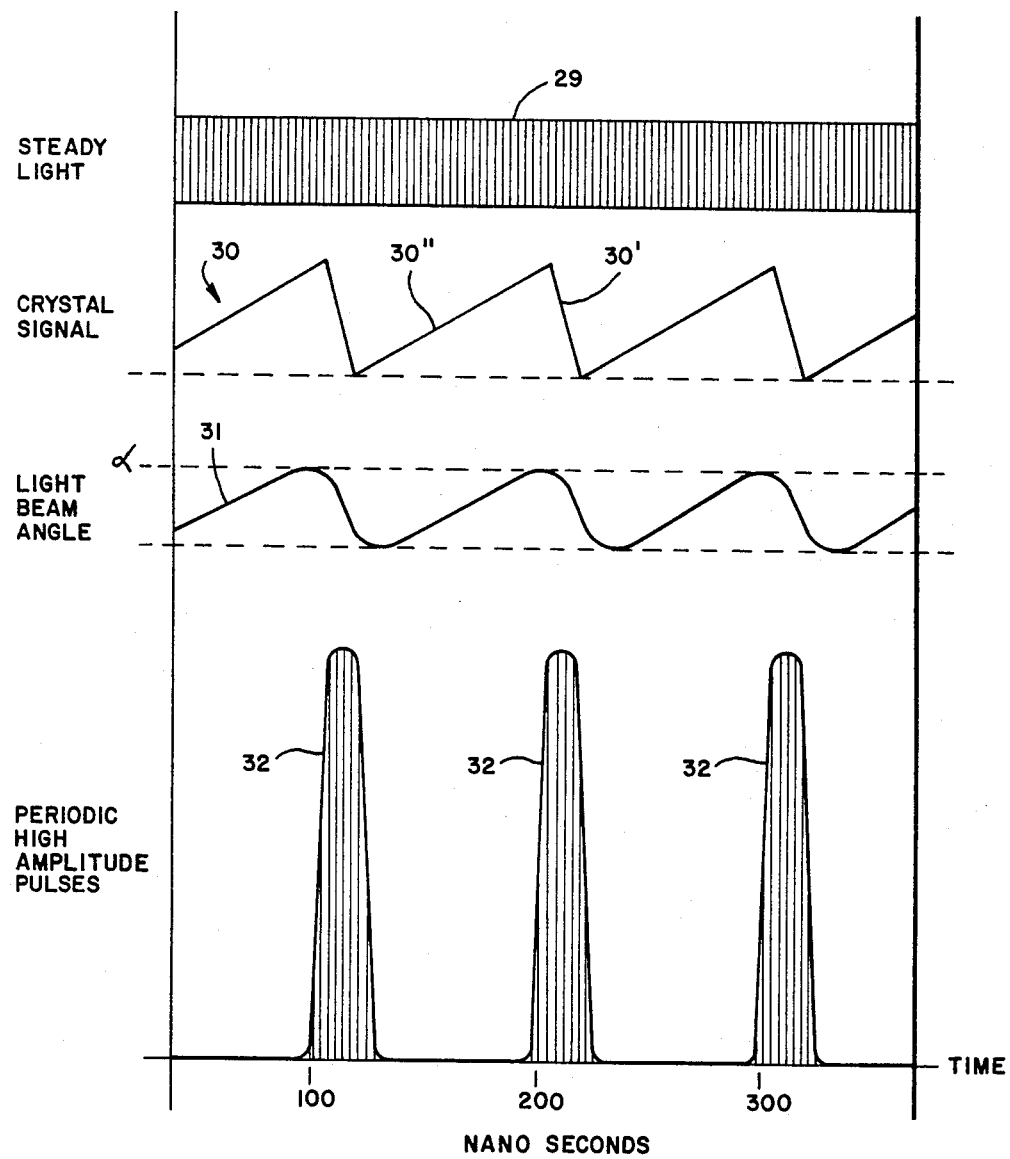
FIG. 3 illustrates a series of qualitative wave forms useful in explaining basic principles of operation of the invention.

All of the foregoing will become clearer by now referring to FIG. 3 which qualitatively depicts the time plot of the assymmetrical wave forms in a manner in which the steady light is thereby converted to high amplitude pulses.

Referring specifically to FIG. 3, there is shown at the top by the wave form 29 the constant amplitude coherent steady light emitted from the laser 10 described in FIGS. 1 and 2.

Below the steady light wave form 29 is shown the electrical wave form output from the oscillator 16 of FIGS. 1 and 2 wherein the same is an assymmetrical sawtooth shape designated generally by the numeral 30. As the signal 30 increases in magnitude in an upward or positive direction, the angle between the output beam from the crystal 14 from its initial axis 13 similarly increases as it approaches its new axis 15. When the sawtooth wave form reaches its maximum value and returns to its initial starting point, the output beam from the crystal 14 is similarly caused to move from its new axis back to its initial axis.

The assymmetical sawtooth wave form 30 as shown in FIG. 3 has a steeper slope indicated at 30' when moving from its maximum value to its initial value than its slope 30" between its initial value and maximum value and, as pointed out heretofore, this situation is desirable to effect movement of the laser beam in a similar manner.

Below the wave form 30 of FIG. 3 is depicted at 31 a plot of the angle alpha as a function of time and it will be noted that the angle alpha increases as the wave form 30 increases and decreases or returns at a much higher rate, also corresponding to the return of the wave form.

Below the light beam angle plot 31 there are shown high amplitude pulses 32 representing the accumulation of the light over the time increment when the light beam moves between its initial axis 13 and new axis 15 all as described heretofore.

In the particular example depicted in FIG. 3, the frequency of the wave form and thus the frequency of movement of the light beam through the given angle alpha is ten megacycles/sec. The period between the generation of the high amplitude pulses 32 is thus 100 nano seconds. Accordingly, the difference of the lengths of the helical paths 25 and 27 described in FIG. 1 should constitute a path length for which it will take light approximately 100 nano seconds to travel within the body 17.

If the body 17 comprises glass having a refractive index of 1.622, the speed of light in the glass will be $1.875 \times 10^{10}$ centimeters/second. Therefore, the light will travel a path length of 1875 cm in 100 nano seconds.

With reference to the specific example illustrated in FIG. 1, the total path length for the path 25 is approximately 47a, there being provided 12 helical turns for the path 25 each helical turn or circuit having four "a's", except for the last helical turn which only has three "a's".

The total path length for the path 27, on the other hand, is only equal to 11a.

The difference between the path lengths 25 and 27 is thus 47a-11a which equals 36a.

If the path length 1875 cm is divided by 36, there results the necessary dimension for a in centimeters which comes to approximately 52 cm or about 20.5 inches.

Thus, even for the simple illustrative example shown in FIG. 1, the sides of the body 17 would be less than two feet on a side.

In an actual embodiment, however, the path length 25 would be made up of a far greater number of helical turns than depicted. The relatively small number of 12 turns shown in FIG. 1 is utilized simply to avoid confusion in the drawing.

For example, if four times as many turns are used than shown, the difference in the path lengths would be 180a rather than 36a and the dimension a would then be approximately 10.4 cm or 4.1 inches.

A glass body having a side dimension of approximately five or six inches is entirely feasible and can easily be accommodated within a relatively confined area.

From all of the foregoing, it will thus be evident that the present invention has provided a very effective method and apparatus for converting steady light into output light comprised of periodic high amplitude pulses.

I claim:

1. A method of converting steady light into output light comprised of periodic high amplitude pulses, including the steps of:
   (a) moving a steady light beam through a given acute angle at a given frequency;
   (b) passing said light beam into a solid body of light transmissive material while moving through said given acute angle such that the initially received light in said body when said beam starts its movement through said acute angle follows a first path of a first given length before it emerges from said body, and subsequently received light in said body when said beam has completed its movement through said acute angle, follows a second path of a second given length different from said first given length before it emerges from said body; and
   (c) adjusting the value of said given frequency such that the time for the beam to move through said given acute angle is substantially equal to the time it takes light to travel a path length in said body equal to the difference in said first and second given lengths.

2. The method of claim 1, including the step of providing said body in an elongated shape having a longitudinal axis and a given number of side surfaces parallel to and surrounding said axis to effect internal reflections of the light beam so that when the beam is directed into one side surface, it follows a helical-like path about the longitudinal axis of the body from one end of the body to the other, whereby a path length substantially longer than the length, width or height dimension of the prism shape can be realized.

3. The method of claim 2, in which said steady light is generated by a laser, said method including the further step of collimating the beam of light from said laser prior to moving the light beam through said given acute angle to thereby minimize the spread of the light beam when travelling through said body.

4. A method of converting continuous wave, constant amplitude, coherent light into output light comprised of periodic high amplitude pulses, with minimum light loss, including the steps of:
  (a) providing a source of coherent light;
  (b) collimating said coherent light into a beam to minimize the spread of said coherent light;
  (c) moving said beam from its initial axis through a given acute angle to a new axis, thence returning the beam to its initial axis and repeating the moving of the beam to said new axis and back to its initial axis at a given frequency;
  (d) providing an elongated solid body of light transmissive material having a longitudinal axis and a cross section normal to said axis in the shape of a polygon for which there are at least four sides; said body defining at opposite end portions light entrance and light exit areas; and,
  (e) directing said moving beam into said light entrance area such that its initial axis forms an acute angle with a plane normal to the longitudinal axis of said body sufficient to result in the light, after being internally reflected from the surfaces of said sides over one circuit about the polygon shape, being at a level to clear said light entrance area so that the beam will continue to be internally reflected from the surfaces of said sides to progress about said axis in the manner of a helix until it reaches said light exit area from whence it emerges from said body, the total path length of the light beam initially received in the light entrance area to the light exit area having a first given value and the total path length of the light beam received in said light entrance area when the beam has reached its new axis to the light exit area having a second given value substantially less than said first given value by an amount such that the time it takes light to travel said amount within said body is substantially equal to the time elapsed from the point in time when said beam is on its said initial axis to the point in time that it reaches its new axis, whereby light emerging from said light exit area corresponding to the light beam entering along its initial axis coincides with light emerging from said light exit area corresponding to the light beam entering along its new axis, so that increased light amplitude pulses emerge from said light exit area at a rate corresponding to said given frequency of movement of said light beam.

5. An apparatus for converting steady light into output light comprised of periodic high amplitude pulses, including in combination:
  (a) a steady light source providing a light beam;
  (b) electro-optical means for receiving and moving said light beams through a given acute angle at a given frequency; and,
  (c) a solid body of light transmissive material, said body having a light entrance area and a light exit area positioned such that light entering said entrance area along an initial axis will exit from said light exit area after travelling a first given path length in said body, and light entering said entrance area along a new axis different from said initial axis by said given acute angle, will exit from said light exit area after travelling a second given path length in said body different from said first given length, the time for light to travel a path length equal to the difference between said first and second path lengths being equal to the time for said beam to pass through said given acute angle.

6. An apparatus according to claim 5, in which said body is elongated with a longitudinal axis and has side surfaces from which internal light reflections can take place, said entrance area being on a side surface at one end of said body and said exit area being on a side surface at the opposite end of said body, the number of said side surfaces being such that said light beam is internally reflected therefrom and will travel in the manner of a helical path about said axis, the pitch of said helical path increasing as the angle of the beam with its initial axis approaches said given acute angle.

7. An apparatus according to claim 6, in which said steady light source comprises a laser and means for collimating the light beam from said laser to minimize the spreading of the light beam while travelling in said body.

8. An apparatus for converting continuous wave, constant amplitude coherent light into output light comprised of periodic high amplitude pulses, including, in combination:
  (a) a continuous wave laser for providing a beam of coherent light;
  (b) a collimating lens positioned in front of said laser to collimate said beam along an initial axis;
  (c) an electro-optical crystal intercepting said beam after collimation and having the property of moving the beam through a given acute angle to follow a new beam axis and thence back to its initial axis in response to a given electrical wave form applied to said crystal at a given frequency to define a given time increment for the beam to move from its initial axis to its new axis; and,
  (d) an elongated solid body of light transmissive material having a longitudinal axis and a cross section normal to said axis in the shape of a polygon having at least four sides, said body defining light entrance and light exit areas adjacent to its opposite ends respectively, said light entrance area being positioned to intercept the collimated output beam from said crystal over its degree of movement as defined by said given acute angle between the initial axis of the beam and its new axis, said initial axis forming an acute angle with a plane normal to said longitudinal axis of said body so that said beam is internally reflected by the sides of the body to follow a circuit about the axis of the body progressing from one end of the body to the other in the manner of a helix, the pitch of the helix increasing as the angle between the beam and its initial axis approaches said given acute angle, the light emerging from said body when it reaches said light exit area, the dimensioning of said body and said given acute angle being such that the time for light to travel a path in said body equal to the difference in the path lengths of the beam when entering along its initial axis and when entering along its new axis defines said time increment whereby high amplitude output pulses are passed from said light exit area of said body at said given frequency.

9. An apparatus according to claim 8, in which said body is glass, said sides comprising four polished surfaces lying in planes at 90° to each other, the light circuit followed by said beam appearing essentially as a square helix when viewed along said longitudinal axis of said body as opposed to a circular helix, said light entrance and exit areas being defined by 45° prisms integrally formed onto portions of the sides of said body, the exit area prism being substantially larger than the entrance area prism to accommodate spreading of the light beam in its travel through said body.

10. An apparatus according to claim 8, in which said wave form constitutes an assymmetrical sawtooth shape such that movement of said beam from its new axis back to its original axis is at a substantially higher rate than movement of said beam from its initial axis through said given acute angle to its new axis whereby substantially more than one half of the continuous wave light provided during each period defined by said frequency is converted to said high amplitude pulses.

* * * * *

UNITED STATES PATENT AND TRADEMARK OFFICE
CERTIFICATE OF CORRECTION

PATENT NO. : 4,264,135
DATED : April 28, 1981
INVENTOR(S) : Paul W. Lang

It is certified that error appears in the above-identified patent and that said Letters Patent are hereby corrected as shown below:

At column 4, line 51, before the comma, insert -- divided by the cosine of theta --.

At column 8, line 29, delete the word "travelling" and substitute therefor -- traveling --.

Signed and Sealed this

Sixth Day of October 1981

[SEAL]

Attest:

GERALD J. MOSSINGHOFF

Attesting Officer     Commissioner of Patents and Trademarks